Jan. 9, 1934.     C. R. HUBBARD ET AL     1,942,703
GASKET
Filed Aug. 14, 1931
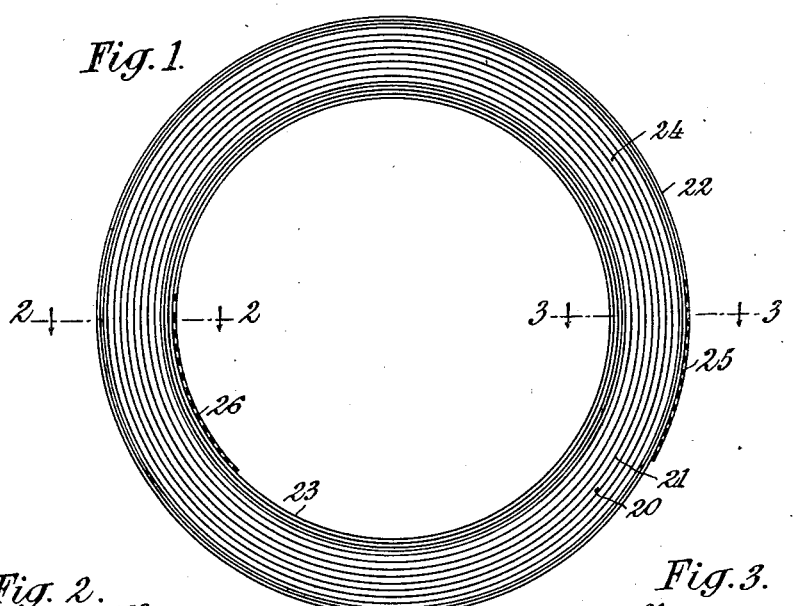
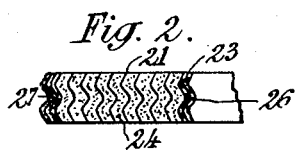
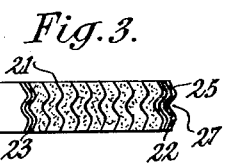
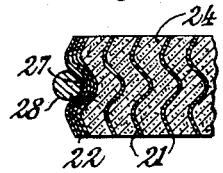
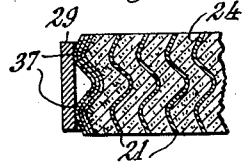
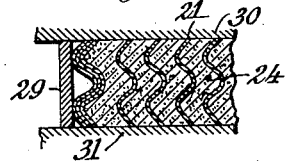
Inventors,
Cecil R. Hubbard
and Francis W. Armstrong,
By their Attorneys
Fraser, Myers & Manley Patented Jan. 9, 1934

1,942,703

UNITED STATES PATENT OFFICE 1,942,703

GASKET

Cecil R. Hubbard and Francis W. Armstrong, Palmyra, N. Y., assignors to the Garlock Packing Company, Palmyra, N. Y., a corporation of New York Application August 14, 1931. Serial No. 557,060

6 Claims. (Cl. 288—1)

This invention relates to an improved gasket adapted to seal the joint between a pair of pipe ends or between a manhole cover and the article to which it is applied, or between any other pair of plane surfaces or approximately plane surfaces.

It is an object of the invention to provide a composite gasket preferably comprising a relatively resilient element of metal and fibrous material so disposed as to yield under pressure and form a perfect seal without being strained beyond the elastic limit of its metal portion and a concentric, relatively rigid and massive reinforcing element; and said relatively rigid element may, if desired, be of substantially the same thickness between its sealing surfaces as the thickness of the gasket and serve as an auxiliary sealing means.

In the drawing illustrating preferred forms of the invention:—

Figure 1 is a side view of a gasket embodying features of the foregoing invention.

Fig. 2 is a large-scale cross-sectional view through the gasket illustrated in Fig. 1, the plane on which the section is taken being indicated by the line 2—2.

Fig. 3 is a similar cross-sectional view through the gasket illustrated in Fig. 1, the plane through which the section is taken being indicated by the line 3—3.

Fig. 4 is a fragmentary cross-sectional view of the gasket illustrated in Fig. 1, the gasket being indicated as having a circumferential reinforcing ring seated in the re-entrant angle at the center of the outer element of the gasket, the scale of this view being even larger than that of Figs. 2 and 3.

Fig. 5 is a similar fragmentary cross-sectional view of the outer portion of a gasket like that illustrated in Fig. 1, the gasket being indicated as being encircled by a cylindrical reinforcing and auxiliary sealing ring of but slightly less thickness between its sealing faces than the thickness of the gasket.

Fig. 6 is a fragmentary cross-sectional view of the portion of the gasket illustrated in Fig. 5 represented as being compressed between the parallel surfaces of portions of two pipe ends.

Fig. 7 is a cross-sectional view of a portion of the gasket illustrated in Fig. 1, the gasket being indicated as being encircled by a modified form of reinforcing and auxiliary sealing ring of a thickness between its sealing faces equal to the thickness of the gasket.

Fig. 8 is a similar view of a construction differing from that shown in Fig. 7 only in that the encircling ring is of a slightly greater thickness between its sealing faces than the thickness of the gasket.

Fig. 9 is a similar view of a construction differing from those shown in Figs. 7 and 8 only in that the encircling ring is of slightly less thickness between its sealing faces than the thickness of the gasket.

Referring first to Figs. 1, 2 and 3, 20 represents a gasket comprising, in general, a spiral ribbon of metal 21 having a plurality of its external coils in contact as at 22 and a plurality of its internal coils in contact as at 23. Throughout the body of the gasket the coils of the spiral 21 are separated, and within the intervening spaces is a filling 24 preferably of some appropriate fibrous material such as asbestos, which may be in the form of a narrow ribbon, tape or yarn.

The ribbon of metal and the strip of fibrous material may be tightly wound to form an annular ring of the desired size and shape, as illustrated in Fig. 1, the metal ribbon being of greater length than the strip of fibrous material so as to provide additional coils at the inner and outer margins which may be drawn into tight mutual contact, after which the ends may be firmly secured together as at 25, 26, in any appropriate manner as by soldering, brazing, or preferably by spot welding.

The metal ribbon should be of a form and degree of elasticity such as to permit it to be materially decreased in effective width when pressure is applied to the opposite surfaces of the gasket to effect a seal; so that, as the gasket is compressed between the surfaces, the filling of fibrous material will be tightly packed between the opposing walls of metal. The properties and form of the metal ring should be such that this compression of the gasket as a whole may take place without straining the metal beyond the elastic limit so that when the gasket is relieved from pressure the parts will be restored to substantially their normal conditions. One appropriate form of metal ribbon is indicated in Figs. 2 to 6, inclusive. This preferred form of ribbon is bent or corrugated longitudinally so that in cross-section it somewhat resembles a letter W having its angular portions rounded. Preferably the corrugations of the ribbon will be so disposed as to provide a re-entrant portion or groove at the center of the outer margin of the gasket as at 27.

When intended for relatively heavy duty, a gasket like that illustrated in Figs. 1, 2 and 3 may be reinforced by snapping an endless metal ring 28 (Fig. 4) into the externally-disposed groove 27. Rings 28 of various metals may be used, depending upon the degree of reinforcement desired.

In Fig. 5 is illustrated a fragmentary portion of a gasket like the one shown in Figs. 1, 2 and 3, having a modified form of reinforcing ring 29 of soft steel, copper or other suitable material applied to its periphery. This ring may be of cylindrical form and preferably of a thickness between its sealing surfaces but slightly less than the thickness of the gasket. When a gasket thus reinforced is compressed between the surfaces of a pair of pipe flanges or other metal surfaces 30, 31, as indicated in Fig. 6, the body portion of the gasket may be compressed until its thickness is reduced to that of the reinforcing ring 29, after which the reinforcing ring itself becomes effective as a seal.

If desired, the reinforcing ring may be of the form illustrated in Figs. 7, 8 and 9, in which it is designated by the reference character 29'. This ring may be of an internal form which is complemental to the peripheral form of the gasket so that it may be snapped into position over the finished gasket and firmly held in place by the interengaging annular elements. The ring 29' may be of a thickness between its sealing surfaces equal to the thickness of the gasket as indicated in Fig. 7, or of a thickness slightly greater than the thickness of the gasket as indicated in Fig. 8. Preferably the ring 29' should be of a thickness slightly less than the thickness of the gasket as indicated in Fig. 9 so that the gasket may be tightly compressed between the surfaces to be sealed before contact is made with the opposite sides of the ring. This ring 29' in any one of the forms illustrated in Figs. 7, 8 and 9, like the ring 29 illustrated in Fig. 5, is adapted to serve as an auxiliary sealing device as well as a gasket reinforcing ring. Such an auxiliary sealing element is of primary importance when the pipe ends or other elements sealed by the gasket form a part of a system which is subjected to relatively high pressures. The application of such high pressures is usually accompanied by increases of temperature which expand the elements sealed by the gasket and cause them to compress the gasket and thus reduce its thickness. If the gasket is of a greater thickness than that of the auxiliary sealing ring, the gasket alone may serve as an effective seal under relatively low pressures and low temperatures. When subjected to higher pressures and higher temperatures, the gasket may be compressed and reduced in thickness until the surfaces of the parts to be sealed are caused to make contact with and compress the auxiliary sealing ring, which then becomes the primary sealing element adapted to withstand much higher pressures than could be opposed by the gasket alone.

If the auxiliary sealing ring is of equal or greater thickness than the gasket, it will at all times serve as an auxiliary sealing element. Under such circumstances the spiral gasket which is enclosed within the auxiliary sealing ring may be subjected to more or less initial compression the degree of which would vary with the pressure and temperature of the sealed parts. The pressure of the sealed medium which would be greatest at the inner periphery of the gasket would under such circumstances tend to flatten the corrugated elements thereof and increase their sealing efficiency. The relative thicknesses between sealing faces of the ring 29 of Fig. 5 and of the ring 29' of Figs. 7, 8 and 9, as compared with the thickness of the enclosed spiral gasket would depend upon the materials used in the ring and gasket and the character of service to be rendered.

It is not essential that the auxiliary sealing ring should surround the complementary element of the gasket as distinguished from a construction in which the sealing ring might be internally disposed. All that is essential is that the two elements of the gasket be so disposed that the primary sealing element may effect a seal when the compression to which the gasket is subjected and the pressure to be withstood do not exceed predetermined limiting values, and when the degree of compression of the gasket and the pressure to be withstood do exceed such limits the auxiliary sealing ring may become effective.

The corrugated form of the metal ribbon used in making the gasket is of importance in that it not only makes the ring elastic so that it may yield under pressure and subsequently resume its normal form, but the corrugations of two successive coils of the gasket also serve as a means of tightly holding the intervening layers of asbestos ribbon or other fibrous material in a locked relation between the metal elements, thus providing a gasket all portions of which are thoroughly bound together in a well-defined form.

The corrugated form of the metal ribbon is also important in that it provides the peripheral groove adapted to receive the reinforcing element whether of circular form as indicated in Fig. 4, or of any one of the forms illustrated by Figs. 7, 8 and 9, adapted to serve as an auxiliary sealing element.

The metal ribbon in the form of a letter W having its angular portions rounded and base disposed outwardly also cooperates with a reinforcing and auxiliary sealing ring of the specific form illustrated in Fig. 5, in that it provides two spaced surfaces 37 of equal diameter to make contact with the inner surface of the ring.

The invention is not intended to be limited to the particular forms herein selected for purposes of illustration, but should be regarded as including modifications and variations thereof within the scope of the appended claims.

What is claimed is:—

1. A composite gasket comprising an annular, laminated, semi-metallic, relatively resilient, packing element built up of thin, ribbon-like portions of metallic and non-metallic material in alternation having their opposite edges in opposite working faces, and a concentric, metal, annular, relatively rigid, packing element, of a thickness materially greater than that of the ribbon-like portions of the semi-metallic packing element having opposite working faces adapted to serve as extensions of the working faces of the laminated element.

2. A composite gasket, as defined by claim 1, of which the two packing elements are of substantially equal thickness.

3. A composite gasket, as defined by claim 1, of which the metallic packing element is of slightly less thickness than that of the semi-metallic packing element.

4. A composite gasket, as defined by claim 1, of which the adjacent annular walls of the two packing elements are provided respectively with a rib and a groove whereby they may be held in a mutually engaging relation.

5. A gasket comprising a spiral of resilient metal ribbon having a plurality of its inner coils and a plurality of its outer coils in direct contact and firmly secured together and its intermediate coils spaced apart, the cross-sectional shape of the metal ribbon being substantially that of a letter W with its angles rounded and its base disposed outwardly, thus providing a central groove about the outer periphery of the gasket, a filling of fibrous material between the spaced metal coils, and an additional, surrounding, metal reenforcing and auxiliary sealing ring of approximately the same thickness as that of the portion of the structure which it surrounds.

6. A gasket comprising a spiral of resilient metal ribbon having a plurality of its inner coils and a plurality of its outer coils in direct contact and firmly secured together and its intermediate coils spaced apart, the cross-sectional shape of the metal ribbon being substantially that of a letter W with its angles rounded and its base disposed outwardly, thus providing a central groove about the outer periphery of the gasket, a filling of fibrous material between the spaced metal coils, and an additional, surrounding, metal reinforcing ring seated in the groove of the outer coil of the spiral of metal ribbon.

CECIL R. HUBBARD.
FRANCIS W. ARMSTRONG.